United States Patent [19]
Binnig et al.

[11] Patent Number: 5,877,497
[45] Date of Patent: Mar. 2, 1999

[54] DATA ACQUISITION AND CONTROL APPARATUS FOR SCANNING PROBE SYSTEMS

[75] Inventors: Gerd K. Binnig, Wollerau; Walter Häberle, Waedenswil, both of Switzerland; Anton J. Scheich, Munich, Germany

[73] Assignee: International Business Machines Corporation, Armonk, N.Y.

[21] Appl. No.: 952,748
[22] PCT Filed: May 13, 1995
[86] PCT No.: PCT/EP95/01821
§ 371 Date: Mar. 5, 1998
§ 102(e) Date: Mar. 5, 1998
[87] PCT Pub. No.: WO96/35943
PCT Pub. Date: Nov. 14, 1996

[51] Int. Cl.[6] .................................................. H01J 37/00
[52] U.S. Cl. ............................................................ 250/306
[58] Field of Search ..................... 250/306, 307; 73/105

[56] References Cited

U.S. PATENT DOCUMENTS

5,036,196   7/1991   Hosaka et al. .......................... 250/306

Primary Examiner—Kiet T. Nguyen
Attorney, Agent, or Firm—Scully, Scott, Murphy & Presser; Louis P. Herzberg

[57] ABSTRACT

The present application concerns an apparatus for data acquisition and control to be used in connection with a scanning probe system. This apparatus comprises positioning means (3), used to provide for a relative, lateral scan movement of a sample to be scanned and a probe of said scanning probe system, and interface means (1) for processing analog signals (z1, z2) generated by the probe, and for conversion of these analog signals into digital data signals (d1, d2). The apparatus further comprises a converter (4) for conversion of said digital data signals (d1, d2) into composite video signals, and a process controller (2) connected to the positioning means (3), interface means (1) and converter (4) for the control and management of the operation of the scanning probe system.

26 Claims, 7 Drawing Sheets

ND CONTROL
DATA ACQUISITION AND CONTROL APPARATUS FOR SCANNING PROBE SYSTEMS

BACKGROUND OF THE INVENTION

1. Technical Field

The present invention relates to an apparatus which controls the scanning of a sample or body by a scanning probe system, the processing of the signals measured, and the pre-processing for storing such signals on a conventional video recorder.

2. Prior Art

The expression 'Scanning probe system' will hereinafter be used as synonym for all kind of measurement or investigation systems, be it for medical or non-medical purposes, that have a probe for the determination of certain parameters of a sample. The word sample means in this connection any kind of material to be investigated. This is not limited to pure scientific samples such as semiconductors, metals, polymers, tissues, cells, and bacteria. It is also meant to cover human and animal bodies. In such a scanning probe system, the probe runs over the sample to be investigated in a step like manner, as is for example known from computer spin tomography systems, positron emission tomography systems, microtomography systems x-ray systems, scanning tunneling microscope systems, scanning electron microscope systems and so forth. The scan movement of the probe with respect to the sample is not necessarily a translatory movement. There are also systems known that scan a sample by means of a rotational movement of the probe around the sample to be investigated.

In the following, the present invention will be described in detail in connection with scanning probe microscope systems for the sake of simplicity.

The scanning probe microscope techniques evolved from the Scanning Tunneling Microscope (STM) developed by G. Binnig and H. Rohrer in 1982. The STM, which is disclosed for example in the U.S. Pat. No. 4,343,993, led to the development of a huge variety of microscopes. These microscopes are designed to investigate surfaces and atoms, or molecules on top of them, with atomic resolution from 100 nm down to about 0.1 nm. A common feature of scanning probe microscope systems is a fine tip, also more generally referred to as probe, with a very small radius of curvature at its apex. The probe is scanned over the surface of a sample by using positioning units.

Some scanning probe techniques are also based on the Atomic Force Microscope (AFM) which was invented by G. Binnig in 1986 (U.S. Pat. No. 4,724,318) and which has been further developed since then. Images of magnetic domains have been obtain by Magnetic Force Microscopy (MFM), as for example described by H. J. Mamin et al. in Applied Physics Letters, Vol. 55 (1989), pp. 318ff. A Scanning Capacitance Microscope is known from the patent U.S. Pat. No. 5,065,103, a Scanning Acoustic Microscope from U.S. Pat. No. 4,646,573, and a Scanning Thermal Profiler from U.S. Pat. No. 4,747,698. The scanning probe microscope techniques are also used in light microscopes having a resolution not limited by diffraction. In these so-called Scanning Near-field Optical Microscopes (SNOMs), described for example in U.S. Pat. No. 4,604,520, the probe essentially consist of a waveguide for light waves ending in a tiny aperture which either receives or emits light within the proximity of the surface of a sample. For the purpose of this invention, all these systems are referred to as scanning probe microscopes (SPMs).

SPMs are in principle simple to implement and provide for extreme resolutions. This is one of the reasons why SPMs are now widely employed when dealing with all kinds of surface analysis and imaging of sub-microscopic phenomena. In the past, SPMs were mostly used for scientific applications. The SPM techniques have to date also found their technical application for example in high technology manufacturing and quality control processes.

Under certain preconditions, SPMs could become more important outside basic science and highly specialized, industrial environments, too. The main factors are cost and complexity of SPM systems which typically include data processing, data acquisition and scan control means. In todays SPM systems, usually expensive hard disks or magneto optic storage disks and specially programmed personal computers are employed. Examples of conventional data acquisition and control systems are given in the article "Data acquisition and control system for molecule and atom-resolved tunneling spectroscopy", E. I. Altman et al., Rev. Sci. Instrum., Vol. 64, No. 5, May 1993, pp. 1239–1243, and in the article "Scan control and data acquisition for bidirectional force microscopy", D Brodbeck at el., Ultramicroscopy, Vol. 42–44, 1992, pp. 1580–1584, North Holland. Both systems, described in the above articles, are computer controlled systems comprising hardware interfaces, a 386-microprocessor based personal computer and specially written software. These kind of systems have to cope with difficulties concerning processing speed as for example described in Section D, with title "Computer system", of the E. I. Altman's article. Even when using assembly language for the program which controls data acquisition and processing the maximum sampling rate that can be achieved is in the range of 150000 samples per second only. There is a demand for systems with faster data collection speed. In addition, the system described by E. I. Altman et al. relies on the access to a fast data storage space. Special software is needed to access extended memory locations beyond the range normally accessible. Such an extended memory is usually small and an additional storage medium for storing complete scans is required. It is an important disadvantage of these systems that the images obtained and afterwards stored in a computer or peripheral memory are gray scale images with a resolution of 8 bits. From this short section giving an overview of existing data acquisition and control systems it is obvious that there are some inherent drawbacks.

Document EP-A-0469274 is an example of such a system. It discloses an ultrasonic inspection and imaging instrument in which, when parts of the same kind are inspected, proper measurements conditions can readily be set to ensure that inspection efficiency is improved. The electrical signal generated by a probe and representing the echo obtained from an object under examination is amplified and fed to a peak detection circuit. The peak value so detected is converted into a digital value and sent as input data onto the bus of a microprocessor unit further equipped with a memory and a display. The measurement data is manipulated in the processor unit according to programs stored in the memory so as to allow reduced image examples to be displayed to, and become modifiable by, an operator.

In case of medical systems, the scan process and data acquisition is usually controlled by the computer. Due to the huge amount of data to be processed and stored, expensive computer systems with high density storage media are employed. To cope with the high speed data acquisition, the storage media are used in these systems have to be very fast. In addition, the resolution of images obtained is only 8 bit.

Document WO-A-85/02105 discloses an ultrasound diagnostic apparatus for displaying two-dimensional blood flow information superimposed over anatomical information on a video display. The apparatus includes a transducer array for transmitting a series of ultrasound bursts toward the area of the patient in which blood flow information is desired. The ultrasound is transmitted in a plurality of directions so as to achieve a sector scan. Ultrasound reflected from the blood is received by the transducer array and converted to corresponding electrical signals. Frequency differences between transmitted and received ultrasound are fed, in digital form, to a processor unit which computes velocity estimators. The signals generated by the processor unit are coupled to a display such as a color television monitor via a scan converter memory which also receives anatomical information derived from the analog signal produced by the transducer array. The document does not address the problem of improving the data acquisition speed and image resolution in an x-y positioning scanning probe system.

Other examples of the art, in the field of microscopes, can be found in documents U.S. Pat. No. 5,212,383, which discloses a scanning electron microscope in which electrons with positional differences are detected by detectors arranged around the specimen under examination and such positional differences are converted into signals for synthesizing color on a video display, and U.S. Pat. No. 4,398,211 which discloses a light microscope using a combination of charge-coupled photodiodes and a high-resolution lens to provide a representative high-resolution picture of an object on a display. In both documents any digital treatment of the data is conducted through a computer with its associated memory and programs and therefore suffers from the same drawbacks mentioned above.

For a further success of the scanning probe technique in whatever area, it is essential to replace the known data acquisition and control systems by faster ones, the quality (resolution) of the data stored being comparable or even improved. It would be furthermore of advantage if one could use a cheap storage medium for storing the huge amount of information. In particular the process control by means of software running on a computer and the data processing with computers have been identified as bottleneck as far data acquisition speed and scan (control) speed are concerned. A further disadvantage of conventional data acquisition systems is that the images obtained are stored with a resolution of only 8 bits. To date, one uses only 8 bit by storing gray scale images, as already mentioned above.

It is an object of this invention to provide for improved data acquisition, by means of Scanning Probe systems, and processing of the data obtained by such systems.

It is an object of this invention to provide for data acquisition and data processing with improved image resolution.

It is an object of this invention to provide for fast and efficient synchronization of the data acquisition/processing and the control of the scanning process.

It is another object of this invention to provide for a system which allows storage of scan data with resolution of more than eight bits.

SUMMARY OF THE INVENTION

This has been achieved by the provision of an apparatus for the control of a scanning probe system and for the processing of analog signals measured by a probe of said system and subsequent conversion of said analog signals into video signals. This apparatus comprises Positioning means for control and regulation of the relative movement of a sample with respect to said probe, Interface means for processing said analog signals, and for transformation of said analog signals into digital data signals, Converter means for conversion of said digital data signals into video signals of high resolution (hereinfater referred to as composite video signals to indicate that these signals are composed of two or more incoming signals) and a Process Controller connected to said Positioning, Interface and Converter means for the control and management of the sample scanning and measurement process.

In an embodiment of the present invention, a single probe is employed to obtain an analog signal carrying information concerning a sample to be investigated. By means of an Interface unit, this analog signal is split up and processed differently, e.g. by different filters. Due to this, a composite video signal can be generated in a later stage, which carries more information than the signals of conventional data acquisition systems.

In another embodiment, this principle is further developed in that two or more probes are employed, each of which generates another type of information concerning the sample to be investigated. A first probe, for example, could be used to determined the surface roughness of a sample, whereas a second probe is employed to investigate the electron density distribution at the surface of the sample. The composite video signal generated by the present apparatus, provided that the signals are put in a proper relation to each other, has an improved information content and might lead to additional findings.

Versatility and speed combined with high resolution image generation and recording are the main advantages of the apparatus herein claimed and described.

BRIEF DESCRIPTION OF THE DRAWINGS

The invention is described in detail below with reference to the following drawings. The drawings are not to scale and some elements are schematically depicted for simplicity in representation.

DETAILED DESCRIPTION OF THE PREFERRED EMBODIMENTS OF THE INVENTION

Figure 1:
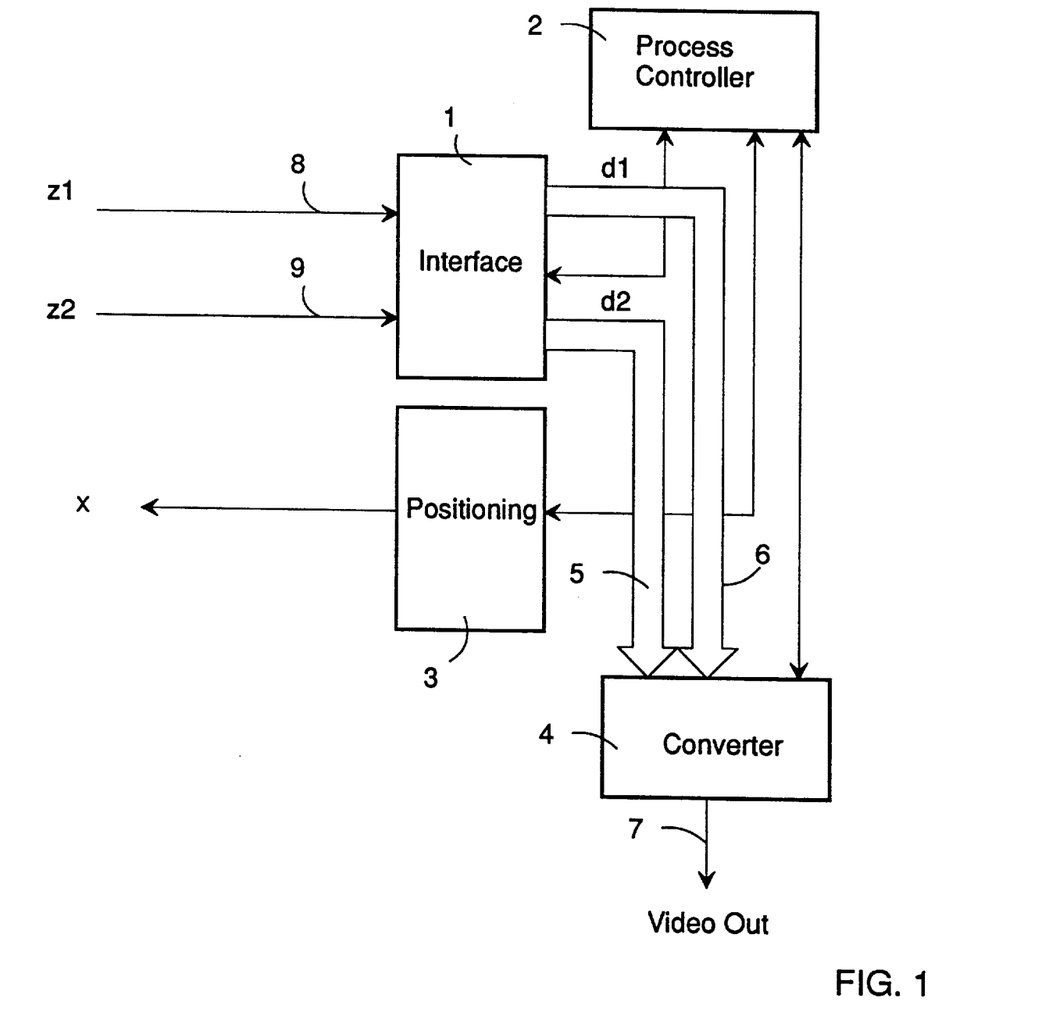
FIG. 1 is a schematic block diagram of the first embodiment of the present invention.

The present invention is in the following explained in detail in connection with the first embodiment, which is illustrated in FIG. 1. The data acquisition and scan control apparatus, shown in this Figure, comprises an Interface 1 which receives at least two different analog signals z1 and z2 via its input lines 8 and 9. These analog signals z1 and z2 are individually processed in said Interface 1. This processing, for example, includes amplification and filtering of the signals. After processing of the analog signals, both signals are converted into digital data signals d1 and d2 by means of two independent analog-to-digital converters which are part of said Interface 1. These digital data signals d1 and d2 are then fed via bus lines 5 and 6 to a Converter 4. This Converter 4 comprises a video encoder having at least two inputs. Usually, such a video encoder has three inputs (not shown in FIG. 1), hereinafter referred to as red, green, and blue (RGB) inputs, only two of which are used for this embodiment. The digital data signals d1 and d2 are fed to these video encoder inputs such that a composite video signal can be generated by the encoder. Due to the fact that at least two digital data signals d1 and d2, which carry different information, are fed to the converter, a composite video signal with an image resolution of more than 8 bits can be obtained. The whole scan process, i.e. the scan movement, the acquisition of data, and the processing and conversion into video signals, is controlled and managed by a Process Controller 2. This Process Controller 2 provides for synchronization of the sampling of the analog signals received from the probe, and defines the step widths of x and y scanning.

Figure 2:
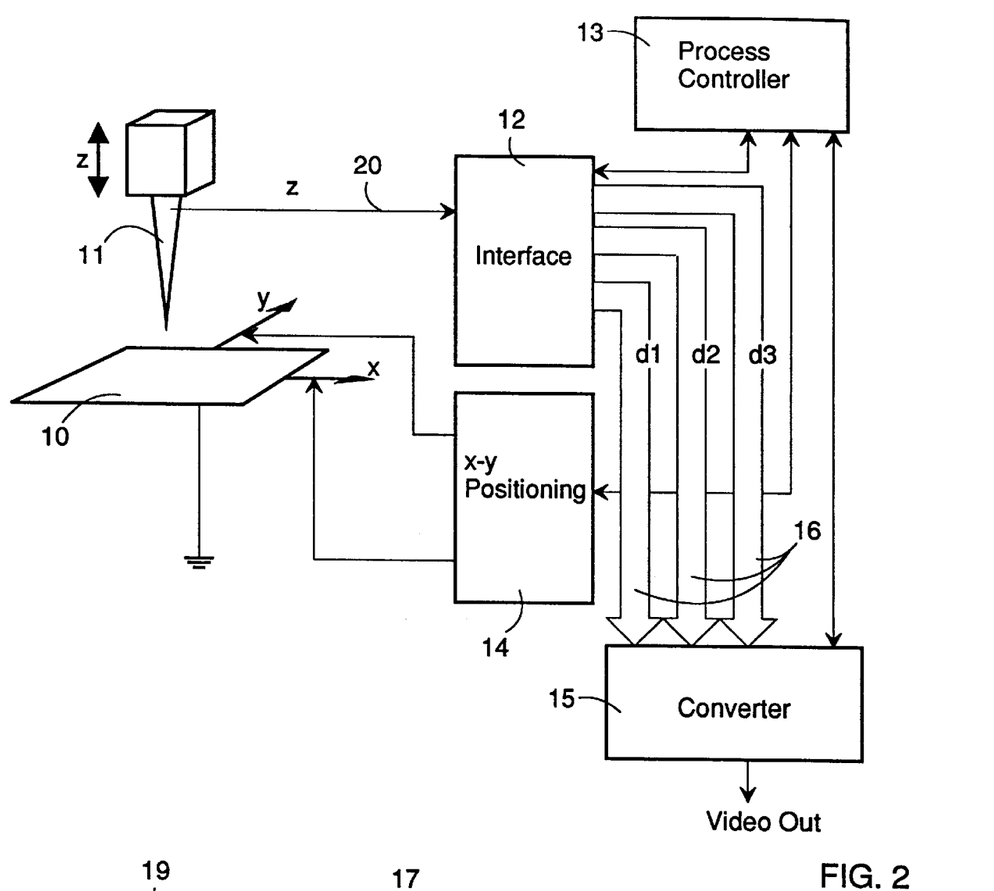
FIG. 2 is a schematic block diagram of a second embodiment of the present invention.
Figure 3:
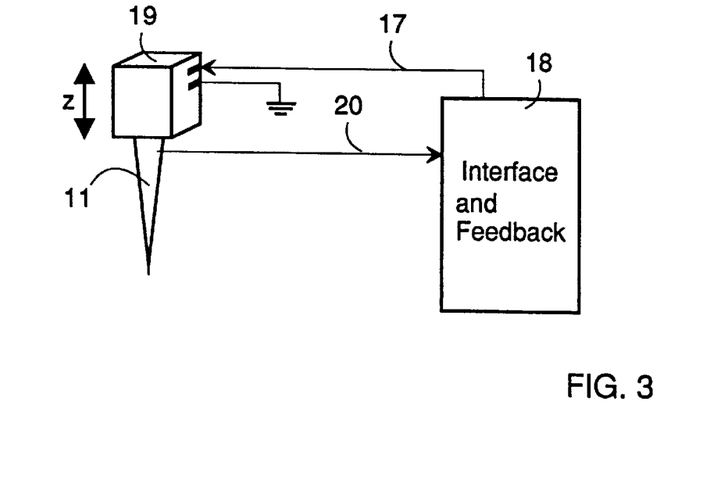
FIG. 3 shows part of a block diagram of a third embodiment of the present invention comprising a feedback mechanism.

The basic building blocks of the herein claimed data acquisition and scan control apparatus will be hereinafter described in connection with more detailed Figures. Before we now concentrate on these building blocks, two different scanning probe microscope (SPM) systems are addressed. A first SPM microscope system, a Scanning Tunneling Microscope (STM) system to be more precise, is illustrated in FIGS. 2 and 3. The tunneling current of an STM carries information concerning the shape of the surface of a sample 10. Usually, the variation of the tunneling current is used to generate a voltage which is applied by means of a feedback line 17 to the piezo 19, for keeping the z-distance constant. In the present example, the feedback loop is part of the Interface and Feeback means 18 (see simplified sketch given in FIG. 3). Information concerning the structure or composition of the surface of the sample 10 is derived from variations in the tunneling signal, which is extremely sensitive to the distance between the probe 11, which is usually a tip, and the surface 10.

In an STM, one controls the z-axis separation of the probe and the sample to a few nanometers by maintaining the probe-to-sample tunneling current constant during the scan. This z-axis gap control is usually achieved by moving the probe relative to the sample in a precisely controlled fashion using piezoactuators, as schematically indicated in FIG. 2. In an AFM, one controls the z-axis separation of the probe and sample by maintaining a constant deflection of the probe support as sensed e.g. by optical interferometry or capacitive coupling with corrections also being made by piezoactuators.

It is also conceivable to use micrometer screws and precision levers for coarse and, depending on the design, fine probe-sample adjustment, or to employ separate electronic means and suitable piezoactuators for z-distance control. In such a case, there would be no need for interaction of the data acquisition and control apparatus of the present invention with the piezoactuator used for z movement, i.e. the feedback loop could be omitted. Such a system is schematically illustrated in FIG. 2.

The surface measurements are, for example, made by maintaining a tunnelling current at a constant value by using a position control mechanism (see Interface and Feedback means 18; FIG. 3) and recording the position control and deflection control variations when scanning the sample 10. The scanning microscope measurements are obtained by scanning a probe 11 positioned relative to a sample surface 10, with relative motion between the probe 11 and the sample surface 10. For sake of simplicity, orthogonal coordinates are assigned to such an SPM system, wherein x and y define the relative, lateral movement of the sample 10 with respect to the probe 11, and the z-axis defines the direction of movement of the probe 11 perpendicular to the sample 10. This means in other words that the surface of a sample or recording medium 10 is scanned step-by-step parallel to the x and y axis, whereas the the topography or surface structure is determined by means of a probe 11 moving up and down parallel to the z-axis. This probe 11 produces analog signals which are fed via interconnection 20 to the Interface 12. These analog signals carry information concerning the surface 10.

Such analog signals need to be processed or stored together with the x- and y-data defining the lateral position of the probe 11 with respect to the sample 10. This in turn facilitates further processing of the information and later reconstruction of the data, i.e. of the surface profile (topography) or three-dimensional map. Generally, the coordinates are Cartesian coordinates with three orthogonal axes, as mentioned above. However, curved scanning is appropriate for some applications, in particular for the tomography type of applications. The present apparatus can be used for curved scanning as well. It is more or less a question of the drive signal and the drive actuator as such, to translate the drive signal provided by the Positioning unit of the present apparatus into an translatory or rotational scan movement.

According to another embodiment of the present invention, illustrated in FIG. 2, x- and y-positioning is achieved by means of an x-y Positioning unit 14 which drives x and y actuators mechanically coupled to a sample 10. It is also practicable to move the probe instead of the sample. The x-y positioning, as well as the processing of signals fed via interconnection 20 to the Interface 12, need to be properly synchronized. In addition, the whole data acquisition process and the scan control needs to be supervised. For this purpose a Process Controller 13 is employed.

Instead of routing the scan data (d1, d2, d3), provided at the output of the Interface 12, to an extended memory location of a computer storage, a conventional video recorder is employed for data storage. In order to pre-process and convert the data, a Converter 15 is employed. This Converter 15 is used to encode the input signals into a composite video output signal (Video Out), according to PAL (Phase Alternation by Line) NTSC, or other video standards. In addition to this composite video output signal, separate chrominance and luminance S-Video (Super Video) signals or RGB signals might be generated for improved video recording and display quality.

Figure 4:
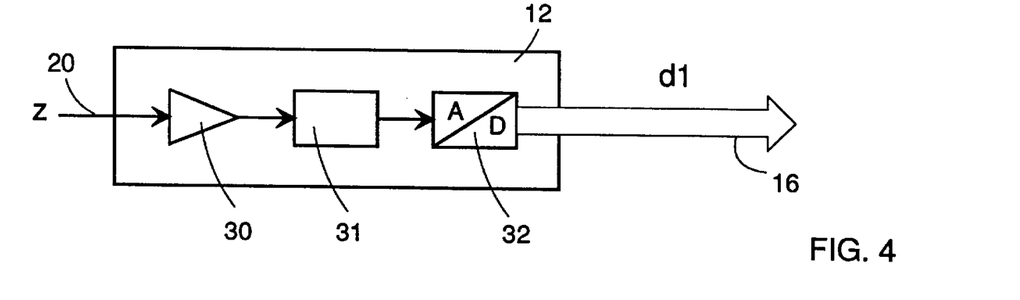
FIG. 4 shows details of the input unit being part of Interface means in accordance with the present invention.
Figure 5:
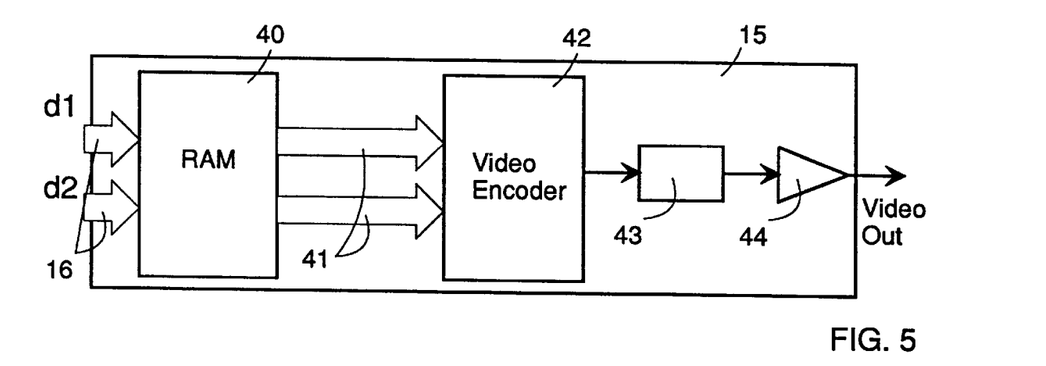
FIG. 5 shows details of a converter used for the conversion of the digital data, provided by the Interface means, into video signals, in accordance with the present invention.

In the following, more details of the first embodiment are given. The Interface 12 at least comprises two parallel input units. An exemplary input unit 12 is shown in FIG. 4. Such an input unit comprises an amplifier 30 and an 8-bit analog-to-digital converter 32, as illustrated. To achieve good results, it is recommended to employ a high speed amplifier with high gain. In case of data acquisition and control systems for Scanning Tunneling Microscopes, amplifiers with gain of more than $10^8$ V/A and bandwidth of at least 50 kHz are well suited. In addition, a filter 31 might be part of the input unit 12. These filters are of particular importance if only one analog signal (see for example signal z in FIG. 11) is provided by the probe of the scanning system, because this signal needs to be treated differently by the parallel input units in order to obtain different digital data signals. In the present example, 8 bit output signals, herein referred to as digital data signals d1–d3, are made available at the output lines 16 of the Interface 12 and are fed to a Converter 15. As shown in FIG. 5, the Converter 15 comprises a memory 40 with at least two input lines 16, e.g. a dual-port random access memory (RAM), and a Video Encoder 42 for conversion of the data into video signals (Video Out). The Converter 15 might in addition comprise circuits 43 and 44 at its output side which amplify the output signals and provide for a phase shift. Typical output specifications of such video outputs are $1V_s$ at 75 Ohms.

Figure 6:
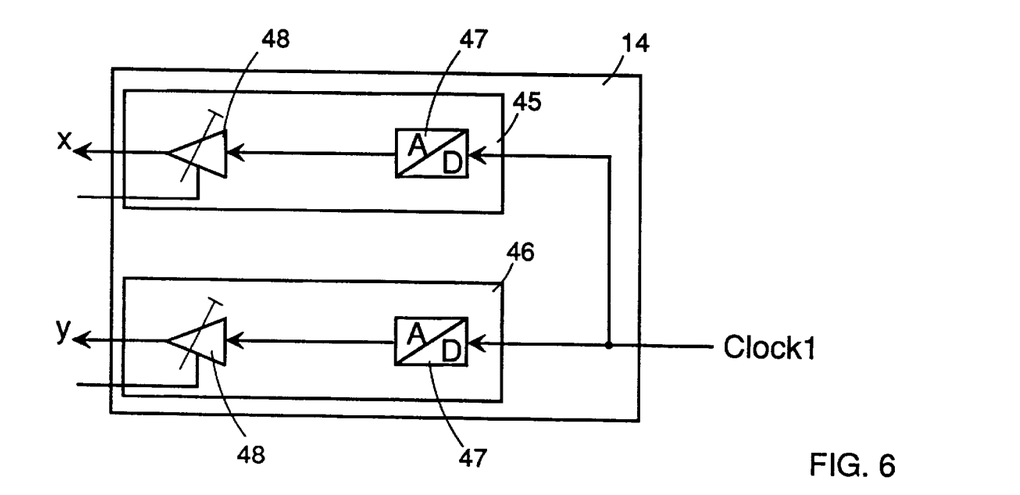
FIG. 6 shows details of an x-y Positioning means in accordance with the present invention.

There are different approaches conceivable for the implementation of an x-y Positioning unit 14. The design of the x-y Positioning unit 14 depends on the kind of actuators used. In FIG. 6, there is an exemplary x-y Positioning unit 14 shown which generates saw-tooth like or triangular output signals x and y. It comprises separate x and y drive means 45 and 46. Each drive means has a digital-to-analog converter, preferably a 10-bit converter, which converts an incoming clock signal (Clock1) into an analog output signal. This analog signal is amplified by means of a gain controlled amplifier 48. The saw-tooth like output signals (x, y), provided by these amplifiers 48, are then forwarded to the actuators for x-y movement. The x output unit might deliver a symmetrical saw-tooth voltage such that z signals can be obtained from the probe during the forward and backward movement of the probe. One row, which means that the x-signal changes from $V_{min}$ to $V_{max}$ or vice versa, might be scanned 512 times, for example. The scan frequency per row can be chosen to be between 1 Hz and 100 Hz, for instance. In addition, a filter might be part of each drive means 45 or 46, as will be described later in connection with another embodiment. Depending on the design of the digital-to-analog converters 47, the amplifiers 48 can be omitted. This is possible if the output current or voltage of the converters 47 is suited for directly driving the x-y actuators.

Figure 7:
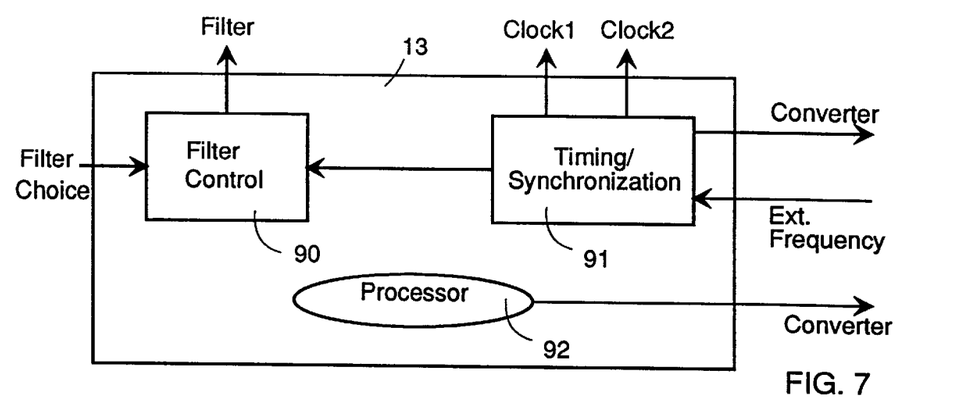
FIG. 7 shows details of a Process Controller in accordance with the present invention.

A Process Controller 13, in accordance with the present invention, is shown in FIG. 7. It comprises a Processor 92, e.g. a micro processor, which is connected to the Converter 15. In addition to the Processor 92, the Process Controller 13 comprises Filter Control means 90, and Timing/Synchronization means 91. The Filter Control means 90 are needed only in case that adaptable filters are used in the input units (see for example input units 70–72 in FIG. 10, and/or x, y drive means 87, and 88 in the same Figure). The Filter Control means 90 switch the filter characteristics of these filters each time when the scanning speed is changed. The Filter Control means 90 might have an input called 'Filter Choice' which is used for external filter selection. The Timing/Synchronization means 91, which are part of the Process Controller 13, comprise a quartz generating a clock signal which is used for synchronization and timing of the whole data acquisition and control apparatus. Certain logic elements are employed in said Timing/Synchronization means 91 in order to generate two different, synchronized clock signals (Clock1 and Clock2). Clock1 is directly used to feed the digital-to-analog converters of the x and y drive means 45, 46. Clock2 is used to trigger the analog-to-digital converters and the digital-to-analog converters.

Figure 8:
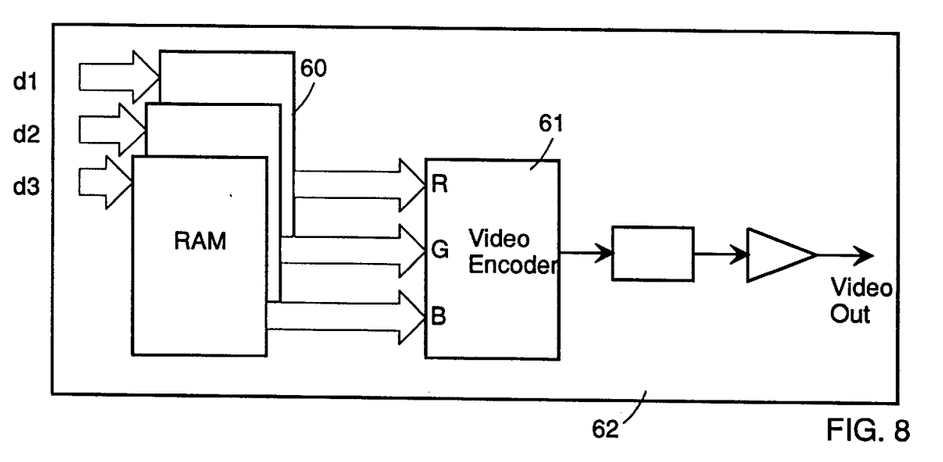
FIG. 8 shows details of an alternative converter used for the conversion of the digital data, provided by Interface means, into video signals, in accordance with the present invention.

In another embodiment of the present invention, a Converter 62 is used instead of the Converter 15 illustrated in FIG. 5. This modified Converter 62, being illustrated in FIG. 8, has got three parallel inputs, for example, to receive the digital data signals d1, d2, and d3 from three parallel input units (not shown). These three digital data signals are stored in a memory having three separate sections 60. The data stored in these sections are then fed from the memory 60 to the red, green, and blue (RGB) inputs of the Video Encoder 61. Due to the fact that all three color inputs of the Video Encoder 61 receive different data, the signal-to-noise (S/N) ratio of the overall data acquisition and control apparatus is increased and the image resolution is greater than 8 bit, which is the normal resolution if one would employ only one input unit. As in FIG. 5, the output line of the Video Encoder 61 comprises two circuits which provide an output signal (Video Out) with $1V_s$ at 75 Ohms.

Figure 9:
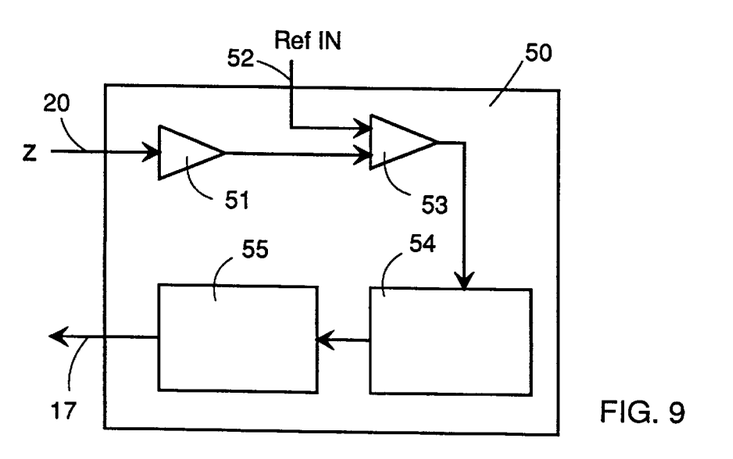
FIG. 9 shows details of a feedback loop employed for actively controlling the z-distance between a probe and a sample.

As already discussed in connection with FIG. 3, there might be a need for a position control mechanism. This is usually implemented by means of a feedback loop. An exemplary circuitry is illustrated in FIG. 9. It comprises a first amplifier 51 connected to the interconnection 20, a second amplifier 53 amplifying the difference signal between the actual analog z signal and a reference signal (Ref IN) fed via a reference input 52 to said position control mechanism 50. The second amplifier 53 is connected to a control circuit 54 which provides an output signal to a high voltage amplifier 55. This high voltage amplifier 55 is employed when the feedback signal on feedback line 17 is used to drive a piezoactuator directly. Depending on the actuator used for z-positioning, the high voltage amplifier 55 can either be omitted or replaced by another, appropriate one. The hereinabove described position control mechanism 50 might be integrated into the Interface and Positioning means 18, see FIG. 3, which are thus not only used for data acquisition and processing, but also for feedback control. Such a position control mechanism might also be realized as separate device.

Another embodiment of the present invention is now described in connection with FIG. 10. According to this embodiment, almost the full 24 bit resolution—which can be achieved when using a video recorder as storage medium—are used. In order to achieve such a high storage resolution, the Interface unit 93 comprises three different, parallel input units 70–72, each of which comprises an amplifier 73, an 8-bit analog-to-digital converter 75, and a filter 74. These input units 70–72 are connected via three 8-bit wide bus lines 76 to three memories 78–80. Instead of these three separate memories 78–80, a memory with three separate partitions might be used.

The three input units 70–72 are designed such that three different digital data signals d1, d2, and d3 are provided even when their inputs are fed with one and the same analog signal z. This can be achieved by means of filters and/or amplifiers having different filter and gain characteristics or by means of frequency splitters or logarithmic amplifiers. One might, for example, employ adaptable filters 74 such that each input unit 70–72 operates on slightly different signals z1, z2, z3. The first input unit 70 could, for example, process unfiltered data z (i.e. z1=z), the second input unit 71 could process slightly high-pass filtered and amplified data z2, and the third input unit 72 could process strongly high-pass filtered data z3. The Interface 93 is connected to three memories 78, 79, 80, as follows. The first memory 78 is connected to the first input unit 70, the second memory 79 is connected to the second input unit 71, and the third memory 80 is connected to the third input unit 72. The output of the first memory 78 is linked to the red-input (R) of the Video Encoder 84 by means of a bus line 81, the second one is connected to the green-input (G) by means of a bus line 82, and the third one to the blue-input (B) by means of a bus line 83. At the video output (Video Out) of the Converter 94, a composite video signal is provided which has almost the full 24 bit resolution. This signal can be recorded by means of a commercially available video recorder connected via a conventional video cable or a Scart cable to the output called Video Out. For phase shift and amplification, devices 85 and 86 might be employed.

Video encoders are commercially available. A first video encoder is described in "A Low Cost, General Purpose S-Video, PAL/NTSC Encoder", G. W. Perkins et al., IEEE Transactions on Consumer Electronics, Vol. 38, No. 3, August 1992, pp. 512–517. Another video encoder is introduced in "A Single Chip Multistandard Video Encoder", H. Alrutz et al., IEEE Transactions on Consumer Electronics, Vol. 39, No. 3, August 1993, pp. 581–586. A further encoder is described in "A Versatile Digital Encoder for Video Signals", S. Drude et al., IEEE Transactions on Consumer Electronics, Vol. 38, No. 3, August 1992, pp. 496–503. Such video encoders usually provide for many additional features which can be used in connection with the present invention. Some encoders allow to overlay and display text and/or cursors, or to invert the RGB signal, for example.

Figure 10:
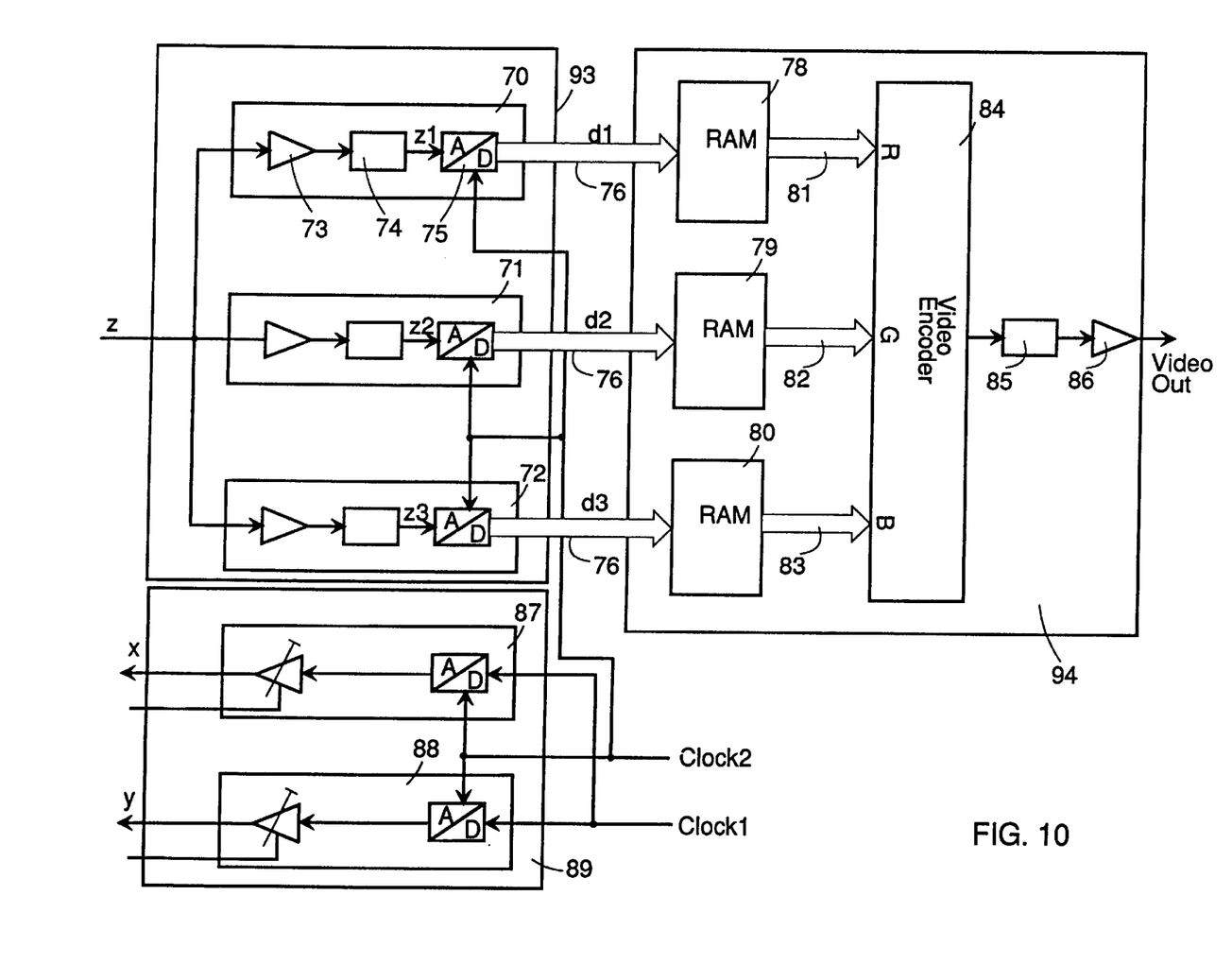
FIG. 10 is a schematic block diagram of another embodiment of the present invention.

In addition, the embodiment shown in FIG. 10 comprises x-y Positioning means 89. As already described in connection with FIG. 6, it comprises x- and y-drive means 87 and 88. Each such drive means has a digital-to-analog converter and an amplifier. The analog-to-digital converters 75 of the input units 70–72 and the digital-to-analog converters of the x- and y-drive means 87 and 88, are triggered by a clock signal referred to as Clock2. The x-y step width is controlled by a clock signal Clock1, which is fed to the inputs of the digital-to-analog converters of the x- and y-drive means 87 and 88. In case that a special scan scheme is desired, one only needs to feed the respective clock signals to the converters of the x- and y-drive means 87 and 88.

In case that the scan speed is modified by applying a clock signal (Clock1) of higher, or lower frequency to the x-y Positioning means 89, it is advantageous to adapt the filter characteristics of the filters 74 employed in the input units 70–72. This can be easily done by means of Filter Control means 90, as illustrated in FIG. 7. In the example illustrated in this Figure, a control signal is provided by the Timing/Synchronization means 91 to the Filter Control means 90 each time the scan speed changes.

Figure 11:
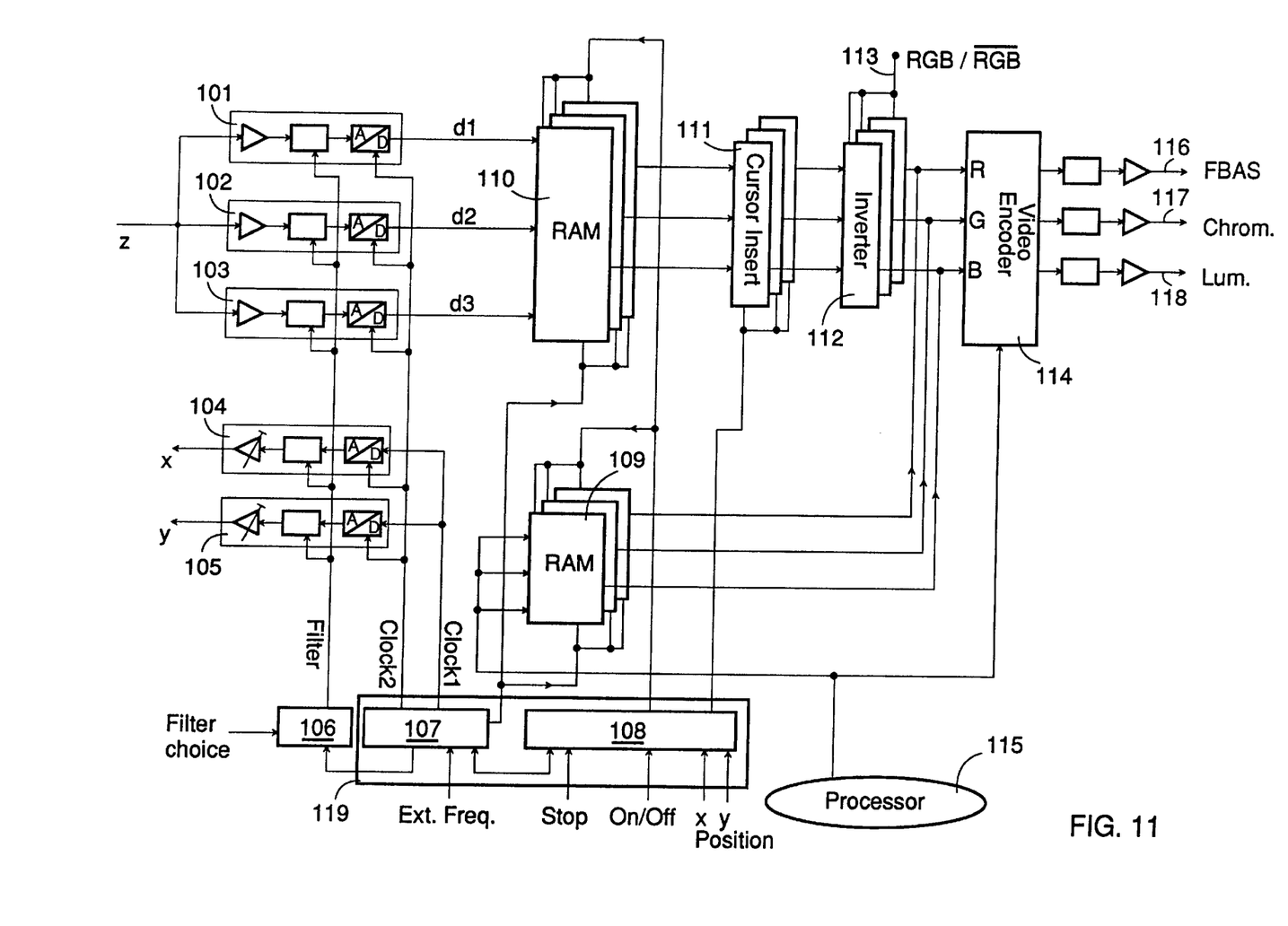
FIG. 11 is a schematic block diagram of a further embodiment of the present invention.

Another embodiment is described in the following with reference to FIG. 11. As shown in this Figure, the input units 101–103, as well as the x- and y-drive units 104 and 105, are the same as described in connection with FIG. 10. Filter Control means 106 are employed for adaptation of the filter characteristics. The filter characteristics can be switched either externally using the input called 'Filter Choice', or automatically each time when the scan speed is altered. For this reason, the Filter Control means 106 are connected to the Timing/Synchronization means 119 which provide for an appropriate signal in case that adaptation of the filters is required or recommended. The Timing/Synchronization means 119 comprise a first logic circuitry 107 and a second logic circuitry 108. The first logic circuitry 107 receives a frequency signal which is either provided by an external clock or an internal crystal quartz. The external clock signal is fed via input 'Ext. Freq.' to said first logic circuitry 107. By means of logic elements, two clock signals 'Clock1' and 'Clock2' are generated. The Clock1 signal is fed to the digital-to-analog converters of the x- and y-drive means 104, 105. The Clock2 signal is used to trigger the analog-to-digital converters of the input units 101–103, as well as the digital-to-analog converters of said x- and y-drive means 104, 105. In addition, an output signal is provided by said first logic circuitry 107 in order to synchronize read/write access of the random access memories (RAMs) 109 and 110. This output signal is synchronized with respect to the Clock2 signal to ensure proper timing of the analog-to-digital converters and the RAMs. Data from said RAMs are read out at video frequency for further processing and video conversion on the right hand side of the RAMs 110. The second logic circuitry 108 is connected to said first logic circuitry 107 and communicates with the RAMs 109 and 110 and with Cursor Insert means 111. This second logic circuitry 108, together with the Cursor Insert means 111, facilitate the insertion of a cursor. In case that the video encoder already comprises means for cursor insertion, the respective elements need not to be implemented by means of discrete devices. In order to obtain inverted RGB signals, Inverters 112 might be employed, as indicated in FIG. 10. In the present embodiment, the inverted RGB signals are made available at the inverter output 113. The embodiment shown in FIG. 11 has an additional useful feature. One can move the cursor on a display screen across an image being displayed. Once the cursor was placed at a position of interest to the user, the coordinates of this cursor position are returned to the scan unit upon request of the user.

The data obtained from said RAM 110 are fed to the three RGB inputs of a Video Encoder 114. This Video Encoder 114 converts the digital RGB signals into an analog composite VHS signal, indicated as FBAS, at output 116, and separate Super-VHS (S-VHS) analog signals (chrominance and luminance) at outputs 117 and 118. These separate Super-VHS signals are provided for improved display and video recording quality. The three outputs 116–118 have 75 Ω drive capability and are available concurrently. Instead of VHS or Super-VHS signals three RGB signals might be provided at the output.

A Processor 115 is employed for control of the RAMs 109 and the Video Encoder 114.

Figure 12:
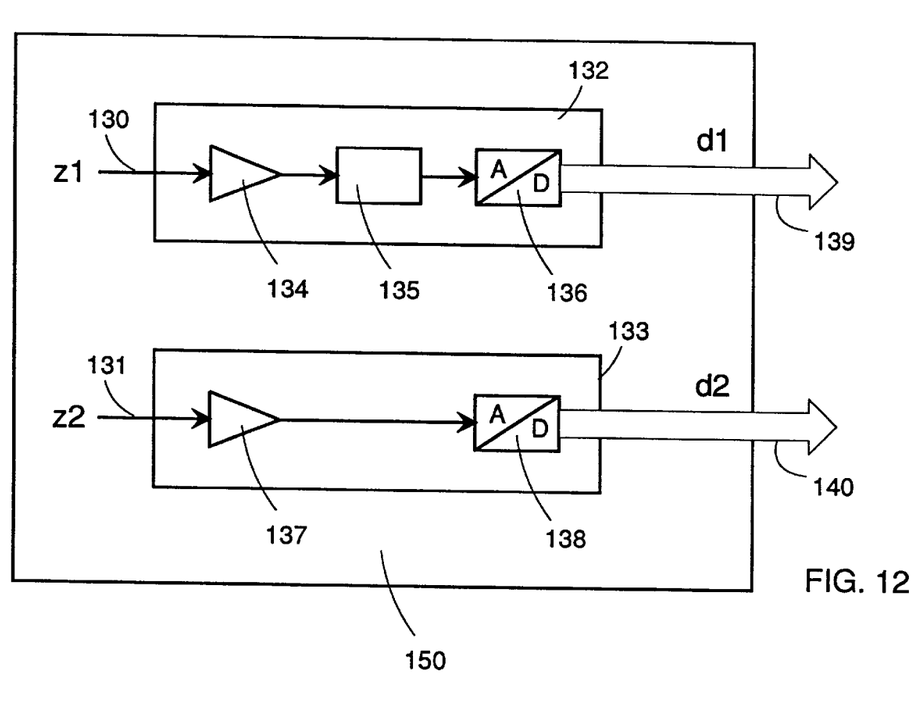
FIG. 12 shows details of the Interface of a further embodiment of the present invention.

A similar data acquisition and control apparatus connected to a video recorder can be applied in other SPM systems which make use of interatomic forces, electrostatic forces, or magnetic forces which occur between the probe and the sample to be scanned. It is also possible to connect two or three different SPM systems, e.g. an SNOM and an AFM, to each of the z inputs of the input units of the data acquisition and control apparatus of the present invention, in order to concurrently investigate a sample with different methods. In FIG. 12, an Interface unit 150 is shown, having two parallel input units 132 and 133. The first input unit 132 receives a first analog signal z1, and the second input unit 133 receives a second analog signal z2. If both analog signals are different, one might employ two similar input units. However, in the present example, the first input unit 132 has an amplifier 134, followed by a filter 135 and an analog-to-digital converter 136, whereas the second input unit 133 has only an amplifier 137 and an analog-to-digital converter 138. The two digital data signals d1 and d2 are made available at output lines 139 and 140, respectively. These output lines are coupled to a Converter for conversion into video signals, as already described in connection with other embodiments of the present invention.

In another embodiment, the data acquisition and control apparatus of the present invention is used in connection with an electromechanical transducer or an array of such transducers described in the PCT Patent Application PCT/EP 94/03052 with international filing date 12 Sep. 1994. Such a transducer generates a voltage at its output carrying information concerning the structure, temperature, chemical composition and so forth, e.g. by measurement of deflections of the transducer or the tunnel current at a tip, of the sample scanned with the probe.

A further embodiment of the invention is characterized in that it also comprises a red, green, and blue (RGB) video output for connection to an RGB color video monitor which displays the various video patterns. This video monitor might be used for control of the scanning process and/or for later analysis of the data stored on the video tape.

It is also possible to employ spatial filters, e.g. in the input units, to enhance certain image contrasts.

Instead of using the RGB color representation, one might realize a system in accordance with the present invention, which makes use of other color representations such as the so-called YIQ (luminance, hue, saturation) color space which is a pseudo luminance-chrominance color space, where Y represents the luminance of a pixel. YIQ systems and RGB systems can be combined and Y can be obtained from the RGB components. The use of a color representation like the YIQ is of particular interest since the Y signal carries information of high resolution.

The video pictures stored on a video tape, or the video signals just processed can be forwarded to a color printer, too. Before being printed, the RGB signals need to be converted into the printing colors via separate color conversion circuits. Such a color printer with color conversion circuits is commercially available.

The present data acquisition and scan control system might equally well be used in connection with medical scan systems, such as tomography and x-ray systems. The improved image resolution and the use of easy to handle video recorders for storage of patient data has several advantages. Due to the improved resolution, the doctor gets additional information which in turn might lead to a more profound diagnostics. The video tape with data stored can be easily copied and other specialists can get these copies. Such video data can also be distributed to remote displays via a hospital internal data communication system, e.g. using an ATM based network system.

For certain applications it is advantageous to place part of the front end of the present data acquisition and control system together with the probe in a UHV chamber or the like. In such a case, the remaining circuit elements, e.g. the Process Controller, x-y Positioning means, and the Converter are located at a distant place. The front end elements might, for example, be interconnected by means of a coaxial cable or the like. It is advantageous to provide for a shielding of the remaining circuit elements. In particular the elements working at video frequency should be shielded.

Having thus described our invention, what we claim as new, and desire to secure by Letters Patent is:

1. Data acquisition and control apparatus for a scanning probe system comprising positioning means (3; 14; 89) providing for a relative scan movement of a sample (10) to be scanned and of a probe (11) of said scanning probe system, said probe serving for measuring at least one property of said sample (10), interface means (1; 12; 18; 93) for processing at least one analog signal (z; z1; z2) generated by said probe (11) as a measurement result and for converting said analog signal into digital data signals (d1, d2), a process controller (2; 13; 106; 115; 119) connected to said positioning means and said interface means for controlling and managing the operation of said scanning probe system characterized in that said interface means (1; 12; 18; 93) processes at least one analog signal (z; z1; z2) and generates therefrom by splitting into different frequency ranges more different digital data signals (d1, d2) than analog signals (z, z1, z2) which are processed, and in that said apparatus further comprises a converter (4; 15; 94) for converting said at least two different data signals (d1, d2) into different color ranges of a video signal (Video Out), preferably having an image resolution greater than 8 bits, said converter having at least two inputs, a first one of said at least two inputs being fed with a first one of said at least two different digital data signals and a second one of said at least two inputs being fed with a second one of said at least two different digital data signals, and said converter being connected to, and controlled by, said process controller (2; 13; 106, 115, 119) as part of the control and management of the operation of said scanning probe system by said process controller.

2. The apparatus of claim 1, wherein only one analog signal (z) is generated by said probe (11), and wherein said interface means (93) comprises at least two different input units (70, 71, 72), each of them independently and differently processing said one analog signal (z) in order to provide said two different digital data signals (d1, d2).

3. The apparatus of claim 2, wherein said two different digital data signals (d1, d2) are obtained by means of said input units having filters with different filter characteristics, or frequency splitters or spatial filters.

4. The apparatus of claim 3, wherein said filter is an adaptable filter, the filter characteristics of which can be switched, preferably to allow adaptation when changing the scan speed with the scanning probe system.

5. The apparatus of claim 4, wherein the filter characteristics of said filters are either controlled and automatically switched by a filter control unit being part of said process, or manually switched.

6. The apparatus of claim 1, wherein said probe (11) generates at least two different analog signals (z1, z2), or wherein at least two probes are employed which generate at least two different analog signals (z1, z2), and wherein said interface means comprises at least two input units (132, 133), the first of said two input units processing the first of said two different analog signals (z1, z2), and the second of said two input units processing the second of said two different analog signals (z1, z2), in order to provide for said two different digital data signals (d1, d2).

7. The apparatus of claim 2 or 6, wherein said input units comprise an amplifier (30) for amplification of analog signals received from a probe, and an analog-to-digital converter (32) for conversion of analog signals into digital data signals.

8. The apparatus of claim 7, wherein said input units comprise a filter (31) for filtering said analog signals.

9. The apparatus of claim 8, wherein said filter is an adaptable filter, the filter characteristic of which can be switched, preferably to allow adaptation when changing the scan speed of the scanning probe system.

10. The apparatus of claim 9, wherein the filter characteristics of said filters are either controlled and automatically switched by a filter control unit (90: 106) being part of said process controller, or manually switched.

11. The apparatus of claim 7, wherein said analog-to-digital converters are triggered by means of a clock signal (Clock2) provided by said process controller.

12. The apparatus of claim 11, wherein said analog-to-digital converters are 8-bit converters providing for 8-bit wide digital data signals.

13. The apparatus of claim 11, wherein said process controller comprises timing/synchronization means used to trigger said analog-to-digital and digital-to-analog converters.

14. The apparatus of claim 7, wherein said process controller (2: 13: 106, 115, 119) comprises timing/synchronization means (91: 119) used to trigger said analog-to-digital and digital-to-analog converters.

15. The apparatus of claim 2, or 6, wherein said interface means comprises three different input units (70, 71, 72) and wherein said converter (94) comprises either three separate memories (78, 79, 80), or one memory with three different partitions, each of said memories or each of said partitions of a memory being connected to one of said three different input units (70, 71, 72) such that the digital data signals (d1, d2, d3) provided by said input units (70, 71, 72) are stored and retrieved in parallel, said converter (94) further comprising a video encoder (84) with a red-, a green-, and a blue-input (RGB) which are connected to said three memories (78, 79, 80), or said partitions of a memory, for conversion of said digital data signals (d1, d2, d3) into said video signal (Video Out).

16. The apparatus of claim 1, wherein said positioning means comprises an output unit with at least one digital-to-analog converter (47), and optionally an amplifier (48), said digital-to-analog converter (47) being fed with a clock signal (Clock1) provided by said control unit in order to generate an output signal (x) to achieve said relative scan movement.

17. The apparatus of claim 16, wherein said positioning means comprises two such output units driving x- and y-actuators for relative scan movement in the x-y plane.

18. The apparatus of claim 16 or 17, wherein said output units generate saw-tooth like output signals.

19. The apparatus of claim 1, comprising feedback means (50) employed to actively control the distance between said probe (11) and said sample (10).

20. The apparatus of claim 1, wherein said converter comprises
  a memory (40), preferably a dual port random access memory, for storing said digital data signals (d1, d2),
  a video encoder (42) for conversion of digital data signals into a video signal (Video Out), said video encoder (42) having at least two separate RGB or YIQ inputs, and
  a bus (41) for fetching said digital data signals from said memory (40) and feeding them to said two separate RGB or YIQ inputs.

21. The apparatus of claim 1, wherein said converter has a conventional FBAS video output (116), a chrominance output (117) and a luminance output (118), or an RGB output, or a YIQ output.

22. The apparatus of claim 1, further comprising a video recorder for recording said video signals (Video Out), and/or a display unit for displaying said video signals (Video Out), and/or a video color printer for printing said video signals (Video Out).

23. The apparatus of claim 1, comprising means for insertion of a cursor and/or means for insertion and display of text.

24. Scanning probe microscope system comprising a scanning probe microscope and a data acquisition and control apparatus in accordance with claim 1.

25. The scanning probe microscope system of claim 24, having at least two different probes for scanning a sample, the two different analog signals (z1, z2) generated by said two probes being processed by a data acquisition and control apparatus.

26. Tomography or X-ray system for investigation of a human or animal body, comprising at least one probe for scanning said body or part thereof, and a data acquisition and control apparatus in accordance with claim 1.

* * * * *